Figure 1:
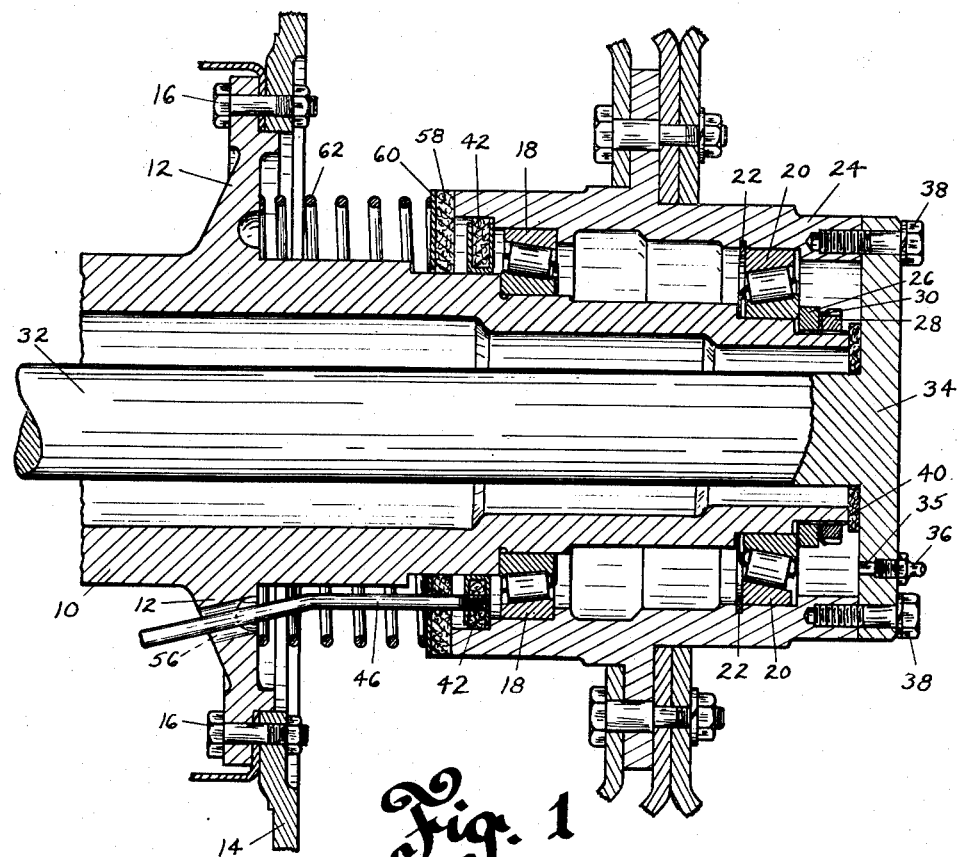

Sept. 9, 1952  V. M. SHELDEN ET AL  2,610,097
LUBRICATING MEANS FOR BEARING ASSEMBLIES
Filed Dec. 1, 1949

INVENTOR
Virgil M. Shelden and
Dallas E. Wells
BY
Ray Eliess
ATTORNEY

Patented Sept. 9, 1952

2,610,097

UNITED STATES PATENT OFFICE 2,610,097

LUBRICATING MEANS FOR BEARING ASSEMBLIES

Virgil M. Shelden, Newburg, and Dallas E. Wells, Hooker, Mo.

Application December 1, 1949, Serial No. 130,396

16 Claims. (Cl. 308—187)

This invention relates to improvements in automotive equipment. More particularly this invention relates to improvements in apparatus for greasing the wheel bearings of automotive vehicles.

It is therefore an object of the present invention to provide an improved apparatus for greasing the wheel bearings of automotive vehicles.

In the operation of automotive vehicles, and particularly in the operation of those automotive vehicles that are heavy it is customary to periodically remove the wheel bearings and repack them with fresh grease. In doing this it is necessary to separate the axles from the hubs and from the axle-enclosing tubes, remove the inner races of the outer wheel bearings, and then remove the hubs from the axle-enclosing tubes. Once this has been done, the wheel bearings can be packed with fresh grease and the hubs, tubes, axles and bearings reassembled. The operation requires the expenditure of about one (1) hours time per wheel, and it requires the exercise of considerable skill; hence it sharply increases the cost of maintaining and operating the automotive vehicles.

It has been found, in a large number of instances, either that the wheel bearings are slightly out of alignment or that the axially-directed pressure on the bearings is too large or too small when the hubs, tubes, axles and bearings are reassembled. Whenever this happens, excessive and costly wearing of the bearings results. Such wearing of the bearings is experienced quite frequently; it being estimated that more bearings are destroyed because of errors of setting made during greasing than are destroyed because of lack of grease. For these reasons, prior methods and apparatus for greasing the wheel bearings of automotive vehicles are objectionable. The present invention obviates these objections by providing a method and apparatus for greasing the wheel bearings of the automotive vehicles without requiring the removal and replacement of those wheel bearings. In this way, the present invention makes it possible to retain and maintain the precise setting which is given to the wheel bearings in the factory of the automotive vehicle manufacturer. This avoids all problems of misalignment occurring during greasing. It is therefore an object of the present invention to provide a method and apparatus of greasing the wheel bearings of automotive vehicles that obviates all need of removing those wheel bearings.

The present invention makes this possible by providing a grease fitting that is located outwardly of the outer wheel bearing of each wheel and by providing a pressure-relieving valve inwardly of the inner wheel bearing of each wheel. With this arrangement, fresh grease can be introduced adjacent the outer wheel bearing of each wheel, forced to pass between the races of that bearing, pass to the inner wheel bearing, pass between the races of that bearing, and then pass to the pressure-relieving valve. In following this path, the fresh grease will drive the old grease ahead of it, and it will coat all of the bearing surfaces with fresh grease. It is therefore an object of the present invention to provide a grease fitting that is located outwardly of the outer wheel bearing of a wheel and to provide a pressure-relieving valve inwardly of the inner wheel bearing of said wheel.

The grease fitting and the pressure-relieving valve are located eccentrically of the axle of the wheel. Such an arrangement coacts with the relative movement of the races of the bearings to cause the fresh grease to pass over and coat all of the bearing surfaces for the wheel. It is therefore an object of the present invention to provide eccentrically-located grease fittings and pressure-relieving valves for the greasing of the wheel bearings of automotive vehicles.

The pressure-relieving valve is located in an elongated tube, and that tube is directed away from the inner wheel bearing. This is important since it keeps grease, issuing from that tube, from contacting the brake drums; and it also enables fresh grease issuing from the end of that tube to signal the completion of the greasing operation. It is therefore an object of the present invention to position the pressure-relieving valve within an elongated tube and to direct that tube away from the inner wheel bearing.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

Figure 2:
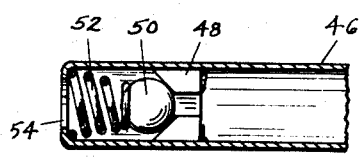

In the drawing, Fig. 1 is a cross sectional view of the hub, axle, tube and wheel bearings of an automotive vehicle, and Fig. 2 is an enlarged cross sectional view of the pressure-relieving valve used in the device shown in Fig. 1.

Referring to the drawing in detail, the numeral 10 denotes a tube which extends to and is connected with the differential housing, not shown, of an automotive vehicle. This tube encloses and supports the rear axle 32 of the vehicle. The tube 10, as shown in the drawing, is provided with a radially-directed projection 12, of annular form, which supports the brake-applying mechanism of the automotive vehicle. In most instances, this radially-directed projection 12 will be formed as a separate component part and will then be pressed onto the tube 10; but for simplicity of illustration the projection 12 was shown as an integral part of tube 10. An annular plate 14 is bolted to the radially-directed projection 12 by bolts 16, and that plate is a part of the brake-applying mechanism of the automotive vehicle.

An anti-friction bearing 18, preferably a roller bearing with tapered races, encircles the tube 10 and bears against a shoulder on that tube. A second anti-friction bearing 20, preferably a roller bearing with tapered races, encircles the tube 10 at a point located outwardly of the bearing 18; and the bearing 20 is disposed adjacent a shoulder near the outer end of tube 10. A hub 24 encircles the tube 10; and that hub receives and supports the outer races of the anti-friction bearings 18 and 20. The outer race of the anti-friction bearing 18 bears against a shoulder adjacent the inner face of the hub 24, and the outer race of the anti-friction bearing 20 bears against a snap ring 22 which fits into an annular groove in the hub 24. The anti-friction bearings 18 and 20 will hold the hub 24 for concentric rotation with the tube 10, and they will hold that hub precisely coaxial with that tube. A nut 26 is threaded onto the outer end of the tube 10, a keeper 30 is disposed adjacent the nut 26, and a locking nut 28 is disposed adjacent the keeper 30; confining that keeper between the nuts 26 and 28. Once the locking nut 28 has been set tightly against the keeper 30, peripheral portions of the keeper 30 can be bent into recesses in the locking nut 28 to prevent undesired rotation of the locking nut 28. These nuts will hold the inner races of the anti-friction bearing 20 against shifting, and that inner race will hold the hub 24 and the bearing 18 in position.

An axle 32 is disposed concentrically within the tube 10, and that axle will be suitably secured to the gears in the differential housing of the automotive vehicle. The outer end of the axle 32 is provided with a radially-directed flange 34; the flange 34 being made integral with the axle 32. A member of machine screws 38 extend through openings in the flange 34 and seat in threaded openings in the hub 24, thus connecting the axle 32 for conjoint rotation with the hub 24. The tube 10, bearings 18 and 20, hub 24, and axle 32 will preferably be of standard size and construction. In and of themselves, those component parts are not part of the present invention; they become so only in combination with the other component parts of the invention.

An opening 35 is provided in the flange 34 of axle 32, and this opening is eccentric of the axis of that axle. The other end of the opening 35 is threaded, and a grease fitting 36 is seated in that opening. The grease fitting 36 will be provided with a check valve, not shown, which will permit grease to pass inwardly through that fitting and into the opening 35 but will not permit grease to leak outwardly through that fitting. The outer end of the grease fitting 36 will be dimensioned so a grease gun can engage and telescope over it. A felt seal 40, of annular form, will encircle the end of axle 32 immediately adjacent flange 34; and that seal will simultaneously bear against the outer end of the tube 10 and the inner face of flange 34. The seal 40 will be relatively stiff and will effectively bridge the space between the tube 10 and flange 34, thus preventing leakage of grease past the outer end of tube 10. A seal 42, which comprises an annulus of felt held within a metallic annular receptacle of U-shaped cross section, is provided adjacent the inner face of the hub 24; and the felt of that seal presses against the hub 24 to prevent leakage of grease. The metallic portion of seal 42 will have a press fit with tube 10, and thus that seal will hold itself in position. That metallic portion of seal 42 has an exhaust port, in the form of a threaded opening therethrough, and that threaded opening will receive the outer end of a tube 46. The inner end of the tube 46 carries a ball seat 48, a ball 50, and a compression spring 52. One end of the spring 52 presses against a flange which encircles an opening 54 in the inner end of the tube 46, and the other end of that spring presses the ball 50 against the seat 48. The spring 52, ball 50, and seat 48 coact to form a pressure-relief valve that can open to prevent the creation of excessive pressures within the grease chamber formed between the hub 24 and the tube 10. By avoiding the creation of such pressures, the pressure-relief valve avoids pressure-induced collapse of seals 40 and 42.

The inner end of the tube 46 passes through an opening in an annular seal 58 of felt; the engagement between that tube and that opening being quite tight. The seal 58 will closely fit tube 10 and will bear against hub 24. The inner end of tube 46 also extends through an opening in a metallic backing plate 60, which plate is immediately adjacent and acts to support the seal 58. The annular plate 60 will preferably be cemented or otherwise secured to the felt seal 58, and a spring 62 will urge the plate 60 and seal 58 against the inner face of the hub 24. The inner end of the spring 62 will bear against the radially-directed projection 12 which supports the brake-applying mechanism.

The inner end of the tube 46 also extends through an opening 56 in the radially-directed projection 12. In doing so, that inner end of tube 46 will be spaced away from the brake-applying mechanism of the automotive vehicle. This is important for two reasons: (a) it keeps grease that issues from the opening 54 of tube 46 from getting onto the brake linings, and (b) it enables fresh grease which issues from opening 54 to signal completion of the greasing operation.

With the construction shown in the drawing, the hub 24 will coact with the seal 40, the flange 34, the tube 10, and the seals 42 and 58 to provide a grease-tight enclosure for the anti-friction bearings 18 and 20. That enclosure will be capable of receiving fresh grease under pressure and will, because of spring 52, ball 50, and seat 48, limit the pressure within the enclosure to valves which seals 40, 42 and 58 can withstand. The seals 40, 42, and 58, the grease fitting 36, and the tube 46 with its spring 52, ball 50, and seal 48 can be applied to the automotive vehicle when that vehicle is being manufactured, or they can be applied to that vehicle, after it has been sold and put into use. Moreover, while the wheel-greasing apparatus provided by the present invention is shown, in the drawing, as it is used on a driving wheel of an automotive vehicle, that apparatus can be used on the front wheels of automotive vehicles, the wheels of trailers, and many other wheels that are supported by spaced anti-friction bearings.

In using the greasing apparatus shown in the drawing, it is only necessary to jack up the wheel of the automotive vehicle, apply a grease gun to the grease fitting 36, and force grease to pass through that grease fitting while rotating that wheel. Grease passing through the grease fitting 36 will enter the grease-tight enclosure formed by hub 24, flange 34, seal 40, tube 10, and seals 42 and 58, and will be forced to pass between the races of the bearing 20, through the space between bearings 18 and 20, between the races of bearing 18, and through tube 46 to opening 54. That grease will, because of the rotation of the wheel, and the eccentricity of grease fitting 36 and tube 46, contact and lubricate each and every part of the inner race of bearing 20 and the outer race of bearing 18; those races experiencing relative movement with grease fitting 36 and tube 46. The greasing of the inner race of bearing 20 and the outer race of bearing 18 will cause an immediate greasing of the complementary races of those bearings as well as the rollers of those bearings; the rollers transferring the grease to those complementary races and being themselves greased in doing so. Two rotations of the wheel are usually adequate to effect complete greasing of the bearings.

The fresh grease will force the old grease to move toward and out of the tube 46. The greasing operation need only be continued until fresh grease is seen to issue from the opening 54 in the inner end of tube 46. At such time, the bearings 18 and 20 and the space between those bearings will be filled with fresh grease; and that grease will assure substantially wear-free operation of the wheel bearings.

The seal 42 will usually be able to retain the grease within the grease-tight enclosure; but if, for some reason, that seal can not retain that grease, the seal 58 will prevent loss of grease. Thus a certain and sure double-sealing arrangement is provided.

The greasing operation can be repeated whenever necessary, and it will assure full and complete greasing of the bearings. By avoiding all need of removing and replacing the wheel bearings, the present invention obviates one of the principal causes of bearing wear.

Whereas a preferred embodiment of the present invention has been shown and described in the drawing and accompanying description it should be apparent to those skilled in the art that various changes may be made in the form of the invention without affecting the scope thereof.

What we claim is:

1. In a wheel assembly, for automotive vehicles, that comprises a tube to encircle the axle, spaced anti-friction bearings supported by said tube, a hub rotatably supported by the outer races of said bearings, an axle extending through said tube, a flange on said axle, a brake-applying mechanism and a support fixed relative to said tube for said brake-applying mechanism, the improvement which comprises an opening in said flange on said axle, a grease fitting mounted in said opening, an exhaust port adjacent the inner end of said hub, whereby grease can be introduced through said grease fitting and can exhaust through said exhaust port, a tube extending from said exhaust port, said tube being directed away from said brake-applying mechanism of said wheel assembly, and a pressure-relief valve in said tube.

2. In a wheel assembly, for automotive vehicles, that comprises a tube to encircle the axle, spaced anti-friction bearings supported by said tube, a hub rotatably supported by the outer races of said bearings, an axle extending through said tube, a flange on said axle, a brake-applying mechanism, and a support fixed relative to said tube for said brake-applying mechanism, the improvement which comprises an opening in said flange on said axle a grease fitting mounted in said opening, an exhaust port adjacent the inner end of said hub, whereby grease can be introduced through said grease fitting and can exhaust through said exhaust port, and a tube extending from said exhaust port, said tube being directed away from said brake-applying mechanism of said wheel assembly.

3. In a wheel assembly, for automotive vehicles, that comprises a tube to encircle the axle, spaced anti-friction bearings supported by said tube, a hub rotatably supported by the outer races of said bearings, an axle extending through said tube, and a flange on said axle, the improvement which comprises an opening in said flange on said axle, a grease fitting mounted in said opening, an exhaust port adjacent the inner end of said hub, whereby grease can be introduced through said grease fitting and can exhaust through said exhaust port, and a pressure-relief valve in communication with said exhaust port.

4. In a wheel assembly, for automotive vehicles, that comprises a tube to encircle the axle, spaced anti-friction bearings supported by said tube, a hub rotatably supported by the outer races of said bearings, an axle extending through said tube, and a flange on said axle, the improvement which comprises an opening in said flange on said axle, a grease fitting mounted in said opening, and an exhaust port adjacent the inner end of said hub, whereby grease can be introduced through said grease fitting and can exhaust through said exhaust port, said grease fitting being adjacent the outer face of said hub and being disposed outwardly of the outermost of said bearings, said exhaust port being adjacent the inner face of said hub and being disposed inwardly of the innermost of said bearings, whereby grease passing from said grease fitting to said exhaust port must pass through said bearings.

5. In a wheel assembly, for automotive vehicles, that comprises a tube to encircle the axle, spaced anti-friction bearings supported by said tube, a hub rotatably supported by the outer races of said bearings, an axle extending through said tube, and a flange on said axle, the improvement which comprises an opening in said flange on said axle, a grease fitting mounted in said opening, and an exhaust port adjacent the inner end of said hub, whereby grease can be introduced through said grease fitting and can exhaust through said exhaust port, said exhaust port being eccentric of the axis of said tube, and said opening in said flange of said axle being eccentric of the axis of said axle.

6. In a wheel assembly, for automotive vehicles, that comprises a tube to encircle the axle, spaced anti-friction bearings supported by said tube, a hub rotatably supported by the outer races of said bearings, an axle extending through said tube, and a flange on said axle, the improvement which comprises an opening in said flange on said axle, a grease fitting mounted in said opening, and an exhaust port adjacent the inner end of said hub, whereby grease can be introduced through said grease fitting and can exhaust through said exhaust port, said opening in said flange of said axle being eccentric of the axis of said axle.

7. In a wheel assembly, for automotive vehicles, that comprises a tube to encircle the axle, spaced anti-friction bearings supported by said tube, a hub rotatably supported by the outer races of said bearings, an axle extending through said tube, and a flange on said axle, the improvement which comprises an opening in said flange on said axle, a grease fitting mounted in said opening, and an exhaust port adjacent the inner end of said hub, whereby grease can be introduced through said grease fitting and can exhaust through said exhaust port, said exhaust port being eccentric of the axis of said tube.

8. In a wheel assembly, for automotive vehicles, that comprises a tube to encircle the axle, spaced anti-friction bearings supported by said tube, a hub rotatably supported by the outer races of said bearings, an axle extending through said tube, and a flange on said axle, the improvement which comprises an opening in said flange on said axle, a grease fitting mounted in said opening, and an exhaust port adjacent the inner end of said hub, whereby grease can be introduced through said grease fitting and can exhaust through said exhaust port.

9. In a wheel assembly, for automotive vehicles, that comprises a tube to encircle the axle, spaced anti-friction bearings supported by said tube, a hub rotatably supported by the outer races of said bearings, an axle extending through said tube, a flange on said axle, a brake-applying mechanism and a support fixed relative to said tube for said brake-applying mechanism, the improvement which comprises an opening in said flange on said axle, a grease fitting mounted in said opening, an exhaust port adjacent the inner end of said hub, whereby grease can be introduced through said grease fitting and can exhaust through said exhaust port, and a tube extending from said exhaust port, said tube extending through an opening in the said support for said brake-applying mechanism and having the free end thereof visible to the eye.

10. In a wheel assembly, for automotive vehicles, that comprises a tube to encircle the axle, spaced anti-friction bearings supported by said tube, a hub rotatably supported by the outer races of said bearings, an axle extending through said tube, and a flange on said axle, the improvement which comprises an opening in said flange on said axle, a grease fitting mounted in said opening, an exhaust port adjacent the inner end of said hub, whereby grease can be introduced through said grease fitting and can exhaust through said exhaust port, a seal between the outer end of said tube and said flange on said axle, and a second seal between said tube and said hub.

11. In a wheel assembly, for automotive vehicles, that comprises a tube to encircle the axle, spaced anti-friction bearings supported by said tube, a hub rotatably supported by the outer races of said bearings, an axle extending through said tube, and a flange on said axle, the improvement which comprises an opening in said flange on said axle, a grease fitting mounted in said opening, an exhaust port adjacent the inner end of said hub, whereby grease can be introduced through said grease fitting and can exhaust through said exhaust port, a seal between the outer end of said tube and said flange on said axle, and a second seal between said tube and said hub, said exhaust port being located in said second seal.

12. In a wheel assembly, for automotive vehicles, that comprises a tube to encircle the axle, spaced anti-friction bearings supported by said tube, a hub rotatably supported by the outer races of said bearings, an axle extending through said tube, a flange on said axle, a brake-applying mechanism, and a support fixed relative to said tube for said brake-applying mechanism, the improvement which comprises an opening in said flange on said axle, a grease fitting mounted in said opening, an exhaust port adjacent the inner end of said hub, whereby grease can be introduced through said grease fitting and can exhaust through said exhaust port, a seal between the outer end of said tube and said flange on said axle, a second seal between said tube and said hub, and a third seal between said tube and said hub, said third seal being biased against said hub by a spring held by said support for said brake-applying mechanism.

13. In a wheel assembly, for automotive vehicles, that comprises a tube to encircle the axle, spaced anti-friction bearings supported by said tube, a hub rotatably supported by the outer races of said bearings, an axle extending through said tube, a flange on said axle, a brake-applying mechanism, and a support fixed relative to said tube for said brake-applying mechanism, the improvement which comprises an opening in said flange on said axle, a grease fitting mounted in said opening, an exhaust port adjacent the inner end of said hub, whereby grease can be introduced through said grease fitting and can exhaust through said exhaust port, a seal between the outer end of said tube and said flange on said axle, a second seal between said tube and said hub, and a third seal between said tube and said hub, said third seal being biased against said hub by a spring held by said support for said brake-applying mechanism, said third seal having a backing plate that is disposed between said seal and said spring.

14. In a wheel assembly, for wheeled vehicles, that comprises a support for spaced anti-friction bearings, spaced anti-friction bearings mounted on said support, and a hub rotatably mounted on said spaced anti-friction bearings, the improvement which comprises a grease fitting disposed in said assembly outwardly of said anti-friction bearings and disposed eccentrically of the axis of one of said anti-friction bearings and a pressure-relief valve disposed in said assembly inwardly of the other of said anti-friction bearings and disposed eccentrically of said other anti-friction bearing, said anti-friction bearings being disposed between said grease fitting and said pressure-relief valve whereby grease entering said grease fitting must pass through both of said anti-friction bearings to reach said pressure-relief valve.

15. In a wheel assembly, for wheeled vehicles, that comprises a support for spaced anti-friction bearings, spaced anti-friction bearings mounted on said support, and a hub rotatably mounted on said spaced anti-friction bearings, the improvement which comprises a grease fitting disposed in said assembly outwardly of said anti-friction bearings and disposed eccentrically of the axis of one of said anti-friction bearings, a pressure-relief valve disposed in said assembly inwardly of the other of said anti-friction bearings and disposed eccentrically of said other anti-friction bearing, said anti-friction bearings being disposed between said grease fitting and said pressure-relief valve whereby grease entering said grease fitting must pass through both of said anti-friction bearings to reach said pressure-relief valve, and seals adjacent said grease fitting and said pressure-relief valve to prevent loss of grease and cause grease under pressure to issue through said pressure-relief valve.

16. In a wheel assembly, for automotive vehicles, that comprises a tube to encircle the axle, spaced anti-friction bearings supported by said tube, a hub rotatably supported by the outer races of said bearings, an axle extending through said tube, and a flange on said axle, the improvement which comprises an opening in said flange on said axle, a grease fitting mounted in said opening, an exhaust port adjacent the inner end of said hub, whereby grease can be introduced through said grease fitting and can exhaust through said exhaust port, a seal between the outer end of said tube and said flange on said axle, a second seal between said tube and said hub, and a pressure-relief valve in communication with said exhaust port, said pressure-relief valve having a spring dimensioned to yield and relieve pressure before said seals collapse.

VIRGIL M. SHELDEN.
DALLAS E. WELLS.

REFERENCES CITED

The following references are of record in the file of this patent:

UNITED STATES PATENTS

| Number | Name | Date |
| --- | --- | --- |
| 1,823,422 | Bock | Sept. 15, 1931 |
| 2,076,218 | Alden | Apr. 6, 1937 |
| 2,474,283 | Simpkins | June 28, 1949 |